(12) United States Patent
Takano

(10) Patent No.: US 7,160,946 B2
(45) Date of Patent: Jan. 9, 2007

(54) METHOD TO IMPROVE HIGH TEMPERATURE COHESIVE STRENGTH WITH ADHESIVE HAVING MULTI-PHASE SYSTEM

(75) Inventor: Tadashi Takano, Torrence, CA (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 10/815,442

(22) Filed: Apr. 1, 2004

(65) Prior Publication Data

US 2005/0222330 A1   Oct. 6, 2005

(51) Int. Cl.
*C08L 39/04* (2006.01)

(52) U.S. Cl. .......................... 525/87; 528/170; 528/322

(58) Field of Classification Search ................ 528/87, 528/170, 322
See application file for complete search history.

(56) References Cited

U.S. PATENT DOCUMENTS

| | | | |
|---|---|---|---|
| 5,747,615 A * | 5/1998 | Repecka | 526/262 |
| 6,313,248 B1 * | 11/2001 | Boyd et al. | 526/262 |
| 6,350,840 B1 | 2/2002 | Schultz et al. | |
| 6,410,611 B1 | 6/2002 | Sakurai et al. | |
| 6,441,213 B1 | 8/2002 | Musa et al. | |
| 6,649,652 B1 * | 11/2003 | Boykin et al. | 514/467 |
| 6,669,929 B1 | 12/2003 | Boyd et al. | |
| 6,831,046 B1 * | 12/2004 | Carew et al. | 510/120 |
| 6,864,335 B1 * | 3/2005 | Guo et al. | 526/234 |
| 2002/0193541 A1 | 12/2002 | Dershem et al. | |
| 2003/0055121 A1 | 3/2003 | Dershem et al. | |
| 2003/0087999 A1 | 5/2003 | Dershem et al. | |
| 2003/0109666 A1 | 6/2003 | Dershem et al. | |

FOREIGN PATENT DOCUMENTS

| EP | 0 878 482 | 11/1998 |
|---|---|---|
| EP | 0 969 061 | 1/2000 |

* cited by examiner

*Primary Examiner*—Jeffrey Mullis
(74) *Attorney, Agent, or Firm*—Jane E. Gennaro

(57) ABSTRACT

A method for improving the cohesive strength at elevated temperature of a die attach adhesive formulation of a liquid curable resin, initiator, and filler, comprises adding to the adhesive formulation an aromatic bismaleimide resin powder that does not dissolve in the curable resin.

6 Claims, No Drawings

METHOD TO IMPROVE HIGH TEMPERATURE COHESIVE STRENGTH WITH ADHESIVE HAVING MULTI-PHASE SYSTEM

FIELD OF THE INVENTION

This invention relates to a multi-phase adhesive composition comprising a solid bismaleimide (BMI) resin powder dispersed in a liquid resin and its use to improve high temperature cohesive strength. In particular, this invention relates to a method for improving high temperature cohesive strength for die attach adhesives within semiconductor packages.

BACKGROUND OF THE INVENTION

Curable resins, such as, epoxies, acrylates or methacrylates, maleimides, vinyl ethers, and bismaleimides, are studied for use as die attach adhesives in semiconductor packaging applications (adhesives used to attach a semiconductor die to a substrate) because of their low moisture absorption, good curability, and long pot life. Two other desirable properties for die attach adhesives are (i) flexibility at room temperature and (ii) adequate cohesive strength at elevated temperature.

Flexibility at room temperature is desirable to absorb the stress in the die and substrate created by their differing expansion and contraction rates in response to temperature during fabrication processes. Flexibility is measured as modulus, the higher the modulus, the less flexibility. High modulus at room temperature translates into increased stress in a semiconductor package and can lead to delamination and die cracking. Therefore, the lower the modulus at room temperature, the better the flexibility and material performance.

High temperatures can degrade adhesives without adequate cohesive strength. If die attach adhesives do not have sufficient cohesive strength to withstand the elevated temperatures encountered during processing and use, the result can be delamination of the die from the substrate and ultimate failure of the semiconductor device in which the die is used.

One method for obtaining flexibility in die attach adhesives at room temperature consists in using components that give low levels of crosslinking. In counterpoint, a method for improving cohesive strength at elevated temperatures consists in using liquid components that give high levels of crosslinking; but this approach is even not always effective because although the crosslink density is increased, cohesive strength at elevated temperatures can remain unaffected.

This invention comprises a solution to the above problem by providing a composition that exhibits improved cohesive strength at elevated temperatures with minimal decrease in room temperature flexibility.

SUMMARY OF THE INVENTION

This invention is a method for improving cohesive strength of compositions used for die attach applications at high temperatures without sacrificing flexibility at room temperature. The method comprises adding a solid aromatic bismaleimide (BMI) resin powder to a die attach formulation in which the die attach formulation comprises a curable resin, or a combination of curable resins, that does not dissolve the BMI resin powder, an initiator for the curable resin, and a filler. In one embodiment, the solid BMI powder will have a particle size of 50 micrometers or smaller and a melting point of greater than 80° C.

DETAILED DESCRIPTION OF THE INVENTION

Suitable solid aromatic BMI resin powders have the structure

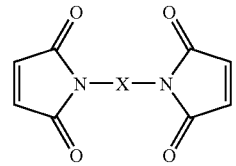

in which X is an aromatic group; exemplary aromatic groups include:

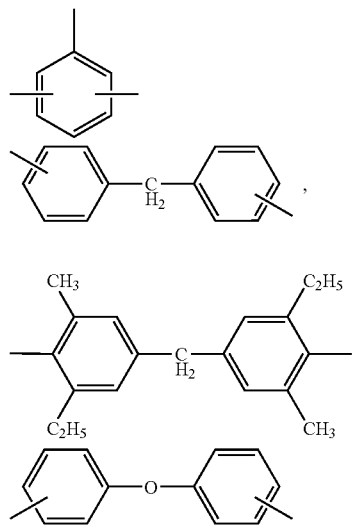

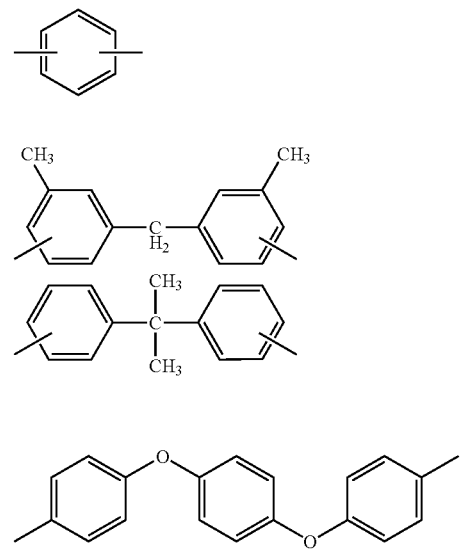

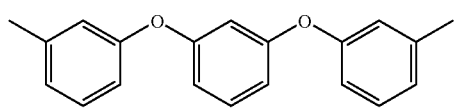
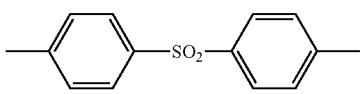

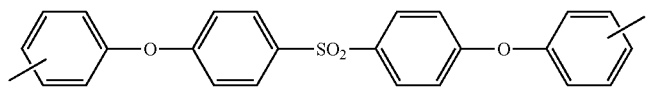

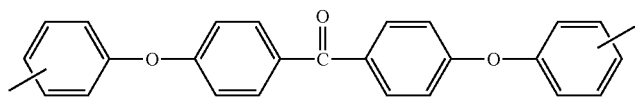

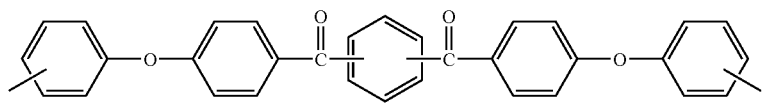

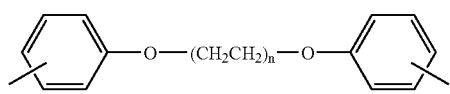
in which n is 1–3,
and

Compounds having these X bridging groups are commercially available, and can be obtained, for example, from Sartomer (USA) or HOS-Technic GmbH (Austria).

The curable resin may be any curable resin, or a combination of curable resins, that is in liquid form and that does not dissolve the solid BMI resin so that the adhesive composition remains as a multi-phase system both before and after cure. Suitable curable resins include liquid epoxies, acrylates or methacrylates, maleimides, vinyl ethers, polyesters, poly(butadienes), siliconized olefins, silicone resins, styrene resins and cyanate ester resins.

Suitable maleimide resins include those having the generic structure

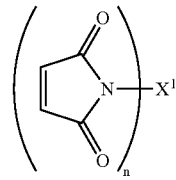

in which n is 1 to 3 and $X^1$ is an aliphatic or aromatic group. Exemplary $X^1$ entities include, poly(butadienes), poly(carbonates), poly(urethanes), poly(ethers), poly(esters), simple hydrocarbons, and simple hydrocarbons containing functionalities such as carbonyl, carboxyl, amide, carbamate, urea, or ether. These types of resins are commercially available and can be obtained, for example, from National Starch and Chemical Company and Dainippon Ink and Chemical, Inc. In one embodiment, the maleimide resins are selected from the group consisting of

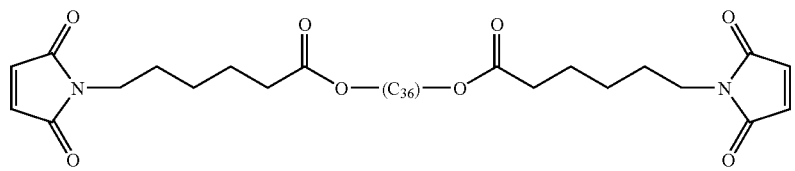

in which $C_{36}$ represents a linear or branched chain (with or without cyclic moieties) of 36 carbon atoms;

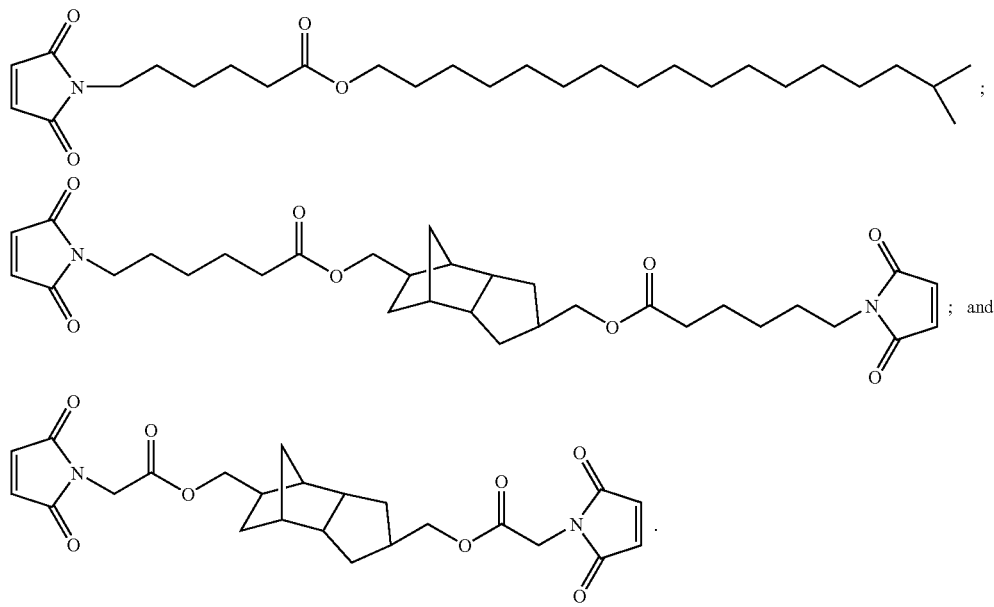

Suitable acrylate resins include those having the generic structure

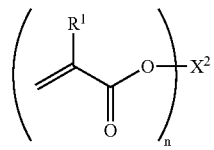

in which n is 1 to 6, $R^1$ is —H or —$CH_3$, and $X^2$ is an aromatic or aliphatic group. Exemplary $X^2$ entities include poly(butadienes), poly(carbonates), poly(urethanes), poly(ethers), poly(esters), simple hydrocarbons, and simple hydrocarbons containing functionalities such as carbonyl, carboxyl, amide, carbamate, urea, or ether. Commercially available materials include butyl (meth)acrylate, isobutyl (meth)acrylate, 2-ethyl hexyl (meth)acrylate, isodecyl (meth)acrylate, n-lauryl (meth)acrylate, alkyl (meth)acrylate, tridecyl (meth)acrylate, n-stearyl (meth)acrylate, cyclohexyl(meth)acrylate, tetrahydrofurfuryl(meth)acrylate, 2-phenoxy ethyl(meth)acrylate, isobornyl(meth)acrylate, 1,4-butanediol di(meth)acrylate, 1.6 hexanediol di(meth)acrylate, 1,9-nonandiol di(meth)acrylate, perfluorooctylethyl(meth)acrylate, 1,10 decandiol di(meth)acrylate, nonylphenol polypropoxylate(meth)acrylate, and polypentoxylate tetrahydrofurfuryl acrylate, available from Kyoeisha Chemical Co., LTD; acrylated poly(butadienes) (CN302, NTX6513, CN301, NTX6039, PRO6270) available from Sartomer Company, Inc; polycarbonate urethane diacrylate (ArtResin UN9200A) available from Negami Chemical Industries Co., LTD; acrylated aliphatic urethane oligomers (Ebecryl 230, 264, 265, 270, 284, 4830, 4833, 4834, 4835, 4866, 4881, 4883, 8402, 8800-20R, 8803, 8804) available from Radcure Specialities, Inc; polyester acrylate oligomers (Ebecryl 657, 770, 810, 830, 1657, 1810, 1830) available from Radcure Specialities, Inc.; and epoxy acrylate resins (CN104, 111, 112, 115, 116, 117, 118, 119, 120, 124, 136) available from Sartomer Company, Inc. In one embodiment the acrylate resins are selected from the group consisting of isobornyl acrylate, isobornyl methacrylate, lauryl acrylate, lauryl methacrylate, poly(butadiene) with acrylate functionality and poly(butadiene) with methacrylate functionality.

Suitable vinyl ether resins include those having the generic structure

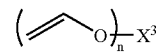

in which n is 1 to 6 and $X^3$ is an aromatic or aliphatic group. Exemplary $X^3$ entities include poly(butadienes), poly(carbonates), poly(urethanes), poly(ethers), poly(esters), simple hydrocarbons, and simple hydrocarbons containing functionalities such as carbonyl, carboxyl, amide, carbamate, urea, or ether. Commercially available resins include cyclohexane dimethanol divinylether, dodecylvinylether, cyclohexyl vinylether, 2-ethylhexyl vinylether, dipropyleneglycol divinylether, hexanediol divinylether, octadecylvinylether, and butandiol divinylether available from International Speciality Products (ISP); Vectomer 4010, 4020, 4030, 4040, 4051, 4210, 4220, 4230, 4060, 5015 available from Sigma-Aldrich, Inc.

Suitable poly(butadiene) resins include poly(butadienes), epoxidized poly(butadienes), maleic poly(butadienes), acrylated poly(butadienes), butadiene-styrene copolymers, and butadiene-acrylonitrile copolymers. Commercially available materials include butadienes (Ricon 130, 131, 134, 142, 150, 152, 153, 154, 156, 157, P30D) available from Sartomer Company, Inc; random copolymer of butadiene and styrene (Ricon 100, 181, 184) available from Sartomer Company Inc.; maleinized poly(butadiene) (Ricon 130MA8, 130MA13, 130MA20, 131MA5, 131MA10, 131MA17, 131MA20, 156MA17) available from Sartomer Company, Inc.; acrylated poly(butadienes) (CN302, NTX6513, CN301, NTX6039, PRO6270, Ricacryl 3100, Ricacryl 3500) available from Sartomer Inc.; epoxydized poly(butadienes) (Polybd 600, 605) available from Sartomer Company. Inc. and Epolead PB3600 available from Daicel Chemical Industries, Ltd; and acrylonitrile and butadiene copolymers (Hycar CTBN series, ATBN series, VTBN series and ETBN series) available from Hanse Chemical.

Suitable epoxy resins include bisphenol, naphthalene, and aliphatic type epoxies. Commercially available materials include bisphenol type epoxy resins (Epiclon 830LVP, 830CRP, 835LV, 850CRP) available from Dainippon Ink & Chemicals, Inc.; naphthalene type epoxy (Epiclon HP4032) available from Dainippon Ink & Chemicals, Inc.; aliphatic epoxy resins (Araldite CY179, 184, 192, 175, 179) available from Ciba Specialty Chemicals, (Epoxy 1234, 249, 206) available from Union Carbide Corporation, and (EHPE-3150) available from Daicel Chemical Industries, Ltd.

Suitable siliconized olefin resins are obtained by the selective hydrosilation reaction of silicone and divinyl materials, having the generic structure,

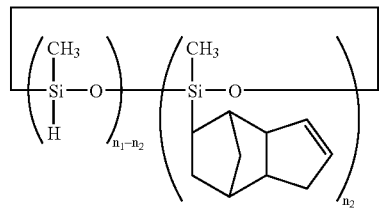

in which $n_1$ is 2 or more, $n_2$ is 1 or more and $n_1 > n_2$. These materials are commercially available and can be obtained, for example, from National Starch and Chemical Company.

Suitable silicone resins include reactive silicone resins having the generic structure

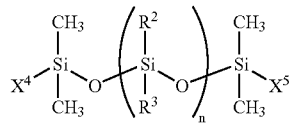

in which n is 0 or any integer, $X^4$ and $X^5$ are hydrogen, methyl, amine, epoxy, carboxyl, hydroxy, acrylate, methacrylate, mercapto, phenol, or vinyl functional groups, $R^2$ and $R^3$ can be —H, —$CH_3$, vinyl, phenyl, or any hydrocarbon structure with more than two carbons. Commercially available materials include KF8012, KF8002, KF8003, KF-1001, X-22-3710, KF6001, X-22-164C, KF2001, X-22-170DX, X-22-173DX, X-22-174DX X-22-176DX, KF-857, KF862, KF8001, X-22-3367, and X-22-3939A available from Shin-Etsu Silicone International Trading (Shanghai) Co., Ltd.

Suitable styrene resins include those resins having the generic structure

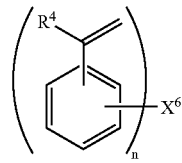

in which n is 1 or greater, $R^4$ is —H or —$CH_3$, and $X^6$ is an aliphatic group. Exemplary $X^3$ entities include poly(butadienes), poly(carbonates), poly(urethanes), poly(ethers), poly(esters), simple hydrocarbons, and simple hydrocarbons containing functionalities such as carbonyl, carboxyl, amide, carbamate, urea, or ether. These resins are commercially available and can be obtained, for example, from National Starch and Chemical Company or Sigma-Aldrich Co.

Suitable cyanate ester resins include those having the generic structure

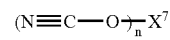

in which n is 1 or larger, and $X^7$ is a hydrocarbon group. Exemplary $X^7$ entities include bisphenol, phenol or cresol novolac, dicyclopentadiene, polybutadiene, polycarbonate, polyurethane, polyether, or polyester. Commercially available materials include; AroCy L-10, AroCy XU366, AroCy XU371, AroCy XU378, XU71787.02L, and XU 71787.07L, available from Huntsman LLC; Primaset PT30, Primaset PT30 S75, Primaset PT60, Primaset PT60S, Primaset BADCY, Primaset DA230S, Primaset MethylCy, and Primaset LECY, available from Lonza Group Limited; 2-allyphenol cyanate ester, 4methoxyphenol cyanate ester, 2,2-bis(4-cyanatophenol)-1,1,1,3,3,3-hexafluoropropane, bisphenol A cyanate ester, diallylbisphenol A cyanate ester, 4-phenylphenol cyanate ester, 1,1,1-tris(4-cyanatophenyl)ethane, 4-cumylphenol cyanate ester, 1,1-bis(4-cyanateophenyl)ethane, 2,2,3,4,4,5,5,6,6,7,7-dodecafluorooctanediol dicyanate ester, and 4,4'-bisphenol cyanate ester, available from Oakwood Products, Inc.

The compositions will further comprise at least one initiator for the curable resin, either a free radical initiator or cationic initiator, depending on whether a radical or ionic curing resin is chosen. If a free radical initiator is used, it will be present in an amount of 0.1 to 10 percent, preferably 0.1 to 5.0 percent, by weight of the organic compounds (excluding any filler). Preferred free-radical initiators include peroxides, such as butyl peroctoates and dicumyl peroxide, and azo compounds, such as 2,2'-azobis(2-methyl-propanenitrile) and 2,2'-azobis(2-methyl-butanenitrile). If a cationic initiator is used, it will be present in an amount of 0.1 to 10 percent, preferably 1 to 5.0 percent, by weight of the organic compounds (excluding any filler). In some cases, both cationic and free radical initiation may be desirable, in which case both free radical cure and ionic cure resins can be used in the composition. Such a composition would permit, for example, the curing process to be started by cationic initiation using UV irradiation, and in a later processing step, to be completed by free radical initiation upon the application of heat.

In general, these compositions will cure within a temperature range of 80°–250° C., and curing will be effected within a length of time of less-than one minute to 60 minutes. The time and temperature curing profile for each adhesive composition will vary, and different compositions can be designed to provide the curing profile that will be suited to the particular industrial manufacturing process.

Depending on the end application, the filler may be electrically or thermally conductive or nonconductive. Examples of suitable conductive fillers include silver, copper, gold, palladium, platinum, nickel, aluminum, and carbon black. Nonconductive fillers include alumina, aluminum hydroxide, silica, vermiculite, mica, wollastonite, calcium carbonate, titania, sand, glass, barium sulfate, and halogenated ethylene polymers, such as, tetrafluoroethylene, trifluoroethylene, vinylidene fluoride, vinyl fluoride, vinylidene chloride, and vinyl chloride.

Other additives, such as adhesion promoters and stablizers, in types and amounts known in the art, may also be added.

EXAMPLES

The following examples show the effect of a multi-phase system on an adhesive formulated for use as a die attach. The adhesive contains a liquid radical curing resin and a solid bismaleimide resin and the results show that the presence of the solid bismaleimide resin serves to maintain cohesive strength at high temperature without significant loss of room temperature flexibility.

Three resin systems were formulated to contain a radical curing resin and initiator, and were augmented with a liquid crosslinking agent or varying amounts of a solid BMI resin to improve cohesive strength at high temperatures. In addition to the radical curing resin and initiator, the formulations contained silver flake (filler), epoxy silane and acrylic silane (adhesion promoters) and a phenolic stabilizer.

The radical curing resin in Example 1 was a mixture of a polybutadiene backbone diacrylate oligomer and an isobornyl methacrylate monomer. The liquid crosslinking agent in formulation 1H was a tetra acrylate monomer.

The radical curing resin in Example 2 was a mixture of a liquid bismaleimide oligomer, a vinylether oligomer with carbamate functionality, and an isobornyl methacrylate monomer.

The radical curing resin in Example 3 was a mixture of a polybutadiene backbone urethane diacrylate oligomer and an isobornyl methacrylate monomer.

The compositions were tested for cohesive strength at high temperature, flexibility, moisture pick-up and viscosity.

Cohesive strength was measured as die shear strength of the adhesive used to bond a 7.6×7.6 mm ceramic die to a ceramic substrate where failure was 100% cohesive. Adhesion to ceramic substrates is generally very strong; therefore, the failure of the adhesive occurs entirely within the adhesive matrix and is a 100% cohesive failure. This tests the material strength instead of the adhesive strength to the substrate. Commercially acceptable values for cohesive strength are in the range of greater than or equal to 25 kg/die at 260° C.

Each adhesive formulation was dispensed onto a ceramic substrate and a ceramic die (7.6×7.6 mm) was placed onto the adhesive formulation. The die and substrate assembly was placed in an oven and the adhesive was cured under nitrogen, with a 30 minute ramp from room temperature to 175° C., followed by a 15 minute hold at 175° C. Ten assemblies for each adhesive were prepared. Each die was sheared from its substrate at 90 degrees with a Dage 2400-PC Die Shear Tester at 260° C. The results were pooled and averaged.

Flexibility was measured as modulus; commercially acceptable values for modulus from room temperature to 250° C. are in the range of 50 to 7000 MPa. Below 50 MPa, the adhesive is too soft and moves, and does not adequately hold the die as it is being wire bonded to the substrate in a subsequent operation. Higher than 7000 MPa, the adhesive becomes too inflexible and does not adequately absorb the stress of thermal cycling during fabrication operations.

Specimen were prepared for modulus testing by curing the materials in a thin film (300 μm~500 μm thickness) on a non-stick board, according to a cure profile of a 30 minute ramp from room temperature to 175° C., followed by 15 minutes at 175° C. under nitrogen purging in a box oven. The film was cut to an appropriate size for DMTA analysis. Modulus was tested using a Rheometrics DMTA MKV (Rheometric Scientific, USA), in Tensile Mode of Deformation. The modulus was measured from −65° C. to 300° C. at 3° C./min of temperature ramping, 10 Hz frequency, and strain at level 0 under nitrogen purging.

Commercially acceptable values for moisture absorption are in the range of less than 0.4 wt % at saturation. Specimen were prepared for moisture pickup testing by curing the materials into a thin film (300 μm~500 μm thickness) on a non-stick board, according to a cure profile of a 30 minute ramp from room temperature to 175° C., followed by 15 minutes at 175° C. under nitrogen purging in a box oven. Cured specimen were then cut into pieces weighing approximately one gram each. The cured materials were tested in a DVS-2000 Dynamic Vapor Sorption Analyzer (WTB Binder, Germany). The sample was allowed to equilibrate at 85° C. and zero humidity until the weight was stable and all the residual moisture had been removed from the sample. The sample weight was recorded into the program, and the profile was set up to maintain 85° C. and 85% relative humidity. The sample was exposed to this humidity until saturation and the % moisture absorbed recorded.

Commercially acceptable values for viscosity are less than 35,000 cP at 5 rpm and 25° C. Viscosity was measured on a Brookfield cone-plate viscometer using a CP-51 spindle at 5 rpm at 25° C.

Formulation compositions and results of performance testing are presented in Tables 1–6 and show that when solid BMI powder is present in the composition at a concentration from greater than 3 wt % to 30 wt % there is an improvement in cohesive strength at elevated temperature. There are also increases in moisture pick-up and viscosity, but these are within the acceptable range for die attach applications. In another embodiment, the solid BMI is present at a concentration from 5 wt % to 27 wt %.

TABLE 1

| Example 1 Composition | | | | | | | | |
|---|---|---|---|---|---|---|---|---|
| Components Parts by Weight | 1A | 1B | 1C | 1D | 1E | 1F | 1G | 1H |
| Oligomer | 50 | 50 | 50 | 50 | 50 | 50 | 50 | 50 |
| Monomer | 40 | 40 | 40 | 40 | 40 | 40 | 40 | 40 |
| Acrylic Silane | 2 | 2 | 2 | 2 | 2 | 2 | 2 | 2 |
| Epoxy Silane | 1 | 1 | 1 | 1 | 1 | 1 | 1 | 1 |
| Phenolic Stabil. | 0.1 | 0.1 | 0.1 | 0.1 | 0.1 | 0.1 | 0.1 | 0.1 |
| Radical Initiator | 1 | 1 | 1 | 1 | 1 | 1 | 1 | 1 |
| Silver Filler | 420 | 420 | 420 | 420 | 420 | 420 | 420 | 420 |

TABLE 1-continued

Example 1 Composition

| Components Parts by Weight | 1A | 1B | 1C | 1D | 1E | 1F | 1G | 1H |
|---|---|---|---|---|---|---|---|---|
| Solid BMI | 0 | 3 | 5 | 10 | 15 | 30 | 50 | 0 |
| Liq. Crosslinker | 0 | 0 | 0 | 0 | 0 | 0 | 0 | 10 |

TABLE 2

Example 1 Performance Data

|  | 1A | 1B | 1C | 1D | 1E | 1F | 1G | 1H |
|---|---|---|---|---|---|---|---|---|
| Solid BMI wt %** | 0.0 | 3.1 | 5.0 | 9.6 | 13.7 | 24.2 | 34.7 | 0 |
| Liq Crosslink wt %** | 0 | 0 | 0 | 0 | 0 | 0 | 0 | 9.6 |
| Viscosity cP | 8100 | 8200 | 9100 | 10600 | 14300 | 27900 | 61800 | 4900 |
| Coh Strength @ 260° C., kg$_f$/die | 24 | 20 | 35 | 32 | 34 | 45 | 67 | 19 |
| Modulus MPa |  |  |  |  |  |  |  |  |
| @25° C. | 4788 | 5148 | 5360 | 5944 | 6190 | 5532 | 5106 | 5110 |
| @250° C. | 689 | 822 | 800 | 1397 | 2102 | 2446 | 2448 | 874 |
| Moisture Absorp. wt % | 0.09 | 0.16 | 0.13 | 0.20 | 0.25 | 0.35 | 0.44 | 0.15 |

**Wt % is exclusive of the filler

TABLE 3

Example 2 Composition

| Components Parts by Weight | 2A | 2B | 2C | 2D | 2E |
|---|---|---|---|---|---|
| Oligomer (Liquid BMI) | 40 | 40 | 40 | 40 | 40 |
| Oligomer (Vinylether) | 10 | 10 | 10 | 10 | 10 |
| Monomer | 40 | 40 | 40 | 40 | 40 |
| Acrylic Silane | 2 | 2 | 2 | 2 | 2 |
| Epoxy Silane | 1 | 1 | 1 | 1 | 1 |
| Phenolic Stabilizer | 0.1 | 0.1 | 0.1 | 0.1 | 0.1 |
| Radical Initiator | 1 | 1 | 1 | 1 | 1 |
| Silver Filler | 420 | 420 | 420 | 420 | 420 |
| Solid BMI | 0 | 2 | 10 | 30 | 50 |

TABLE 4

Example 2 Performance Data

|  | 2A | 2B | 2C | 2D | 2E |
|---|---|---|---|---|---|
| Solid BMI wt %** | 0.0 | 2.1 | 9.6 | 24.2 | 34.7 |
| Viscosity, cP | 4600 | 6000 | 11700 | 31100 | 67200 |
| Cohesive Strength @ 260° C., kg$_f$/die | 13 | 12 | 33 | 56 | 58 |
| Modulus, MPa |  |  |  |  |  |
| @25° C. | 5839 | 6238 | 6097 | 5334 | 4806 |
| @250° C. | 258 | 323 | 377 | 451 | 404 |
| Moisture Absorption, wt % | 0.19 | 0.13 | 0.20 | 0.25 | 0.29 |

**BMI wt % is exclusive of the filler

TABLE 5

Example 3 Composition

| Components, Parts by Weight | 3A | 3B | 3C | 3D | 3E |
|---|---|---|---|---|---|
| Oligomer | 40 | 40 | 40 | 40 | 40 |
| Monomer | 40 | 40 | 40 | 40 | 40 |
| Acrylic Silane | 2 | 2 | 2 | 2 | 2 |
| Epoxy Silane | 1 | 1 | 1 | 1 | 1 |
| Phenolic Stabilizer | 0.1 | 0.1 | 0.1 | 0.1 | 0.1 |

TABLE 5-continued

Example 3 Composition

| Components, Parts by Weight | 3A | 3B | 3C | 3D | 3E |
|---|---|---|---|---|---|
| Radical Initiator | 1 | 1 | 1 | 1 | 1 |
| Silver Filler | 420 | 420 | 420 | 420 | 420 |
| Solid BMI | 0 | 3 | 10 | 30 | 50 |

TABLE 6

Example 3 Performance Data

|  | 3A | 3B | 3C | 3D | 3E |
|---|---|---|---|---|---|
| Solid BMI wt %** | 0.0 | 3.4 | 10.6 | 26.3 | 37.3 |
| Viscosity, cP | 7600 | 9100 | 11200 | 25300 | 56700 |
| Cohesive Strength @ 260° C., kg$_f$/die | 20 | 15 | 37 | 66 | 85 |
| Modulus, MPa |  |  |  |  |  |
| @25° C. | 6032 | 6577 | 6904 | 6563 | 5951 |
| @250° C. | 562 | 513 | 1112 | 2800 | 1785 |
| Moisture Absorp wt % | 0.19 | 0.14 | 0.20 | 0.25 | .029 |

**BMI wt % is exclusive of the filler.

What is claimed is:

1. A method for improving the cohesive strength of a cured die attach adhesive at elevated temperature in which the die attach adhesive formulation comprises a liquid curable resin or a combination of curable resins, initiator, and filler, comprising adding to the uncured die attach adhesive formulation at ambient temperature an aromatic bismaleimide resin powder having a structure:

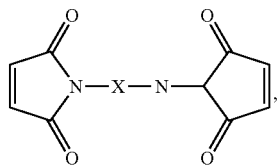

in which X is selected from the group consisting of

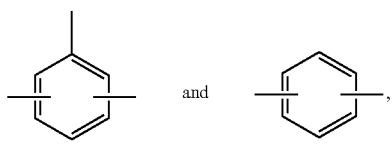

which bismaleimide resin powder does not dissolve in the liquid curable resin so that the die attach adhesive formulation remains as a multi-phase system both before and after cure, in which adhesive formulation the bismaleimide resin powder is present in an amount of 3 weight % to 30 weight %, excluding filler; and in which adhesive formulation the weight ratio of bismaleimide resin powder to liquid curable resin is 1:3 to 1:45.

2. The method according to claim 1 in which the elevated temperature is 260° C. or less.

3. The method according to claim 1 in which the liquid curable resin is a maleimide resin, a cyanate ester resin, an acrylate resin, or a combination of those resins.

4. The method according to claim 3 in which the liquid curable resin is a maleimide resin selected from the group consisting of

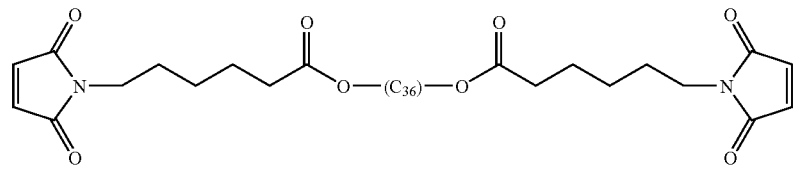

in which $C_{36}$ represents a linear or branched chain (with or without cyclic moieties) of 36 carbon atoms;

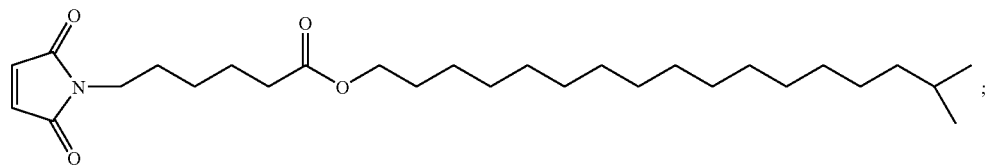

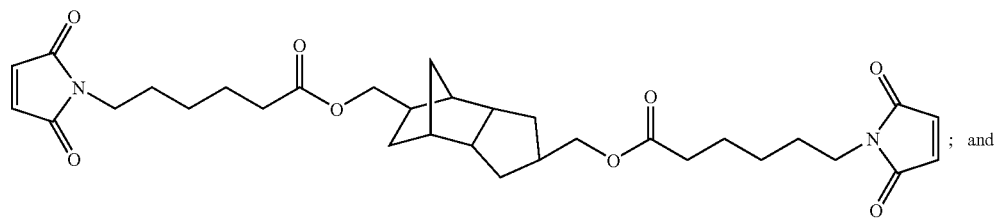
; and

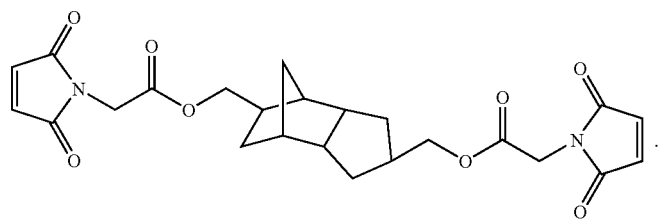
.

5. The method according to claim 3 in which the acrylate resin is selected from the group consisting of isobornyl acrylate, isobornyl methacrylate, lauryl acrylate, lauryl methacrylate, poly(butadiene) with acrylate functionality and poly(butadiene) with methacrylate functionality.

6. The method according to claim 1 in which the bismaleimide resin powder in the adhesive formulation is present in an amount of 5 weight % to 27 weight %, excluding filler, and in which adhesive formulation the weight ratio of bismaleimide resin powder to liquid curable resin is 1:6–1:18.

* * * * *

UNITED STATES PATENT AND TRADEMARK OFFICE
CERTIFICATE OF CORRECTION

PATENT NO. : 7,160,946 B2  
APPLICATION NO. : 10/815442  
DATED : January 9, 2007  
INVENTOR(S) : Tadashi Takano Page 1 of 1

It is certified that error appears in the above-identified patent and that said Letters Patent is hereby corrected as shown below:

In the claims,

At column 13, line 4, please replace " 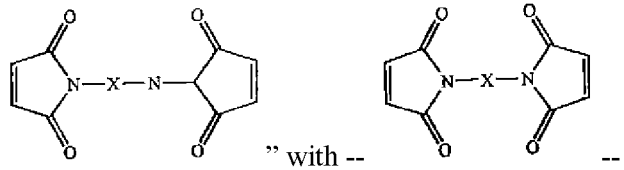 " with -- 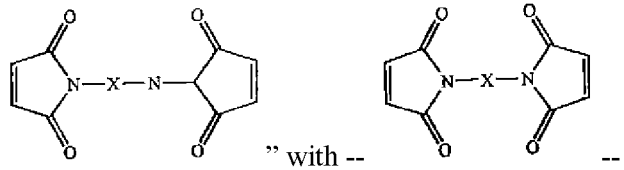 --

Signed and Sealed this  
First Day of March, 2016

Michelle K. Lee  
*Director of the United States Patent and Trademark Office*